United States Patent [19]

Martucci et al.

[11] Patent Number: 5,029,658
[45] Date of Patent: Jul. 9, 1991

[54] MASS/WEIGHT MEASUREMENT FILTERING SYSTEM

[75] Inventors: James Martucci, Libertyville; Robert Lewis, Lindenhurst; Dawn C. Matthews, Grayslake, all of Ill.; Randall A. Zielsdorf, Whitefish Bay, Wis.

[73] Assignee: Clintec Nutrition Co., Deerfield, Ill.

[21] Appl. No.: 507,764

[22] Filed: Apr. 12, 1990

[51] Int. Cl.$^5$ .................. G01G 19/40; G01G 23/10
[52] U.S. Cl. ................................ 177/25.14; 177/185
[58] Field of Search ............. 177/210 FP, 185, 25.14; 364/724.01

[56] References Cited

U.S. PATENT DOCUMENTS

| | | |
|---|---|---|
| 3,643,753 | 2/1972 | Godwin et al. . |
| 3,802,522 | 4/1974 | Thompson et al. . |
| 4,037,095 | 7/1977 | Howells et al. . |
| 4,103,750 | 8/1978 | Melcher et al. . |
| 4,120,370 | 10/1978 | Bosson et al. . |
| 4,367,801 | 1/1983 | Bryan . |
| 4,379,495 | 4/1983 | Cocks et al. . |
| 4,484,146 | 11/1984 | Naito . |
| 4,513,831 | 4/1985 | Lee et al. . |
| 4,535,854 | 8/1985 | Gard et al. . |
| 4,624,331 | 11/1986 | Naito . |
| 4,660,662 | 4/1987 | Katz . |
| 4,705,126 | 11/1987 | Naito . |
| 4,709,770 | 12/1987 | Kohashi et al. . |
| 4,730,499 | 3/1988 | Gianella et al. . |
| 4,771,836 | 9/1988 | Naito et al. . |
| 4,775,949 | 10/1988 | Kalata . |
| 4,782,904 | 11/1988 | Brock . |
| 4,789,014 | 12/1988 | DiGianfilippo et al. . |
| 4,790,398 | 12/1988 | Nobutsugu . |
| 4,817,026 | 3/1989 | Inoue et al. ................ 364/724.01 |
| 4,951,763 | 8/1990 | Zimmerman et al. ......... 177/185 X |

FOREIGN PATENT DOCUMENTS

| | | |
|---|---|---|
| 909279 | 9/1972 | Canada . |
| 57-64117 | 4/1982 | Japan . |
| 1356069 | 6/1974 | United Kingdom . |

Primary Examiner—George H. Miller, Jr.
Attorney, Agent, or Firm—Hill, Van Santen, Steadman & Simpson

[57] ABSTRACT

A filter system for mass/weight apparatus that produces an electrical signal correlated to a mass/weight including a mechanical design for the apparatus so that the resonant vibrational frequency thereof falls above signal components of interest in the electrical signal, a fifth order low pass analog signal, and a digital low pass filter having 2½ poles at a cut-off frequency designated so as to preserve signed characteristics in the signal of interest and significantly attenuate signal characteristics due to resonant vibrational noise.

16 Claims, 6 Drawing Sheets

MASS/WEIGHT MEASUREMENT FILTERING SYSTEM

BACKGROUND OF THE INVENTION

The present invention generally relates to systems for filtering out noise from electrical signals produced by mass/weight measurement apparatus. More particularly, the invention relates to reduction of sensitivity of a load cell to environmental vibration. Yet more particularly, the invention relates to systems for filtering out noise from electrical weight signals generated by devices for vacuum assisted transfer of fluids.

The weight signal produced from a mass/weight measurement device such as a strain gauge load cell or force balance generally includes undesirable components attributable to environmental influences. Such influences can include vibration, loading shock, or the like.

Typically, the component of interest in the weight signal is of a sufficiently low frequency that low pass filtration can be employed to remove many of the undesirable components. However, it is difficult to completely remove all undesirable components.

Certain filtration arrangements are disclosed in U.S. Pat. Nos. 4,817,026 and 4,379,495. However, the arrangements are not suitable for all occasions. Specifically, the disclosed filtration arrangements are applied in situations where the signal components of interest are static, i.e., constant or nearly constant, DC values.

In hospitals, it is frequently necessary to provide solutions for intravenous administration to a patient which contain a variety of drugs in a single solution container. A common example of such need arises when a patient is receiving all of his nutritional needs intravenously. In this situation, the patient will typically receive a basic solution containing amino acids, dextrose, and fat emulsions which provide a major portion of the patient's nutritional needs. However, the solution is insufficient to maintain a patient for an extended period of time. Therefore, a typical total parenteral solution contains as many as 8 to 12 additional additives. The additives are typically minute quantities of vitamins, minerals, electrolytes, etc.

An automatic compounding device has been developed to assist the pharmacist in preparing solutions for total parenteral nutrition. This devices is disclosed in U.S. Pat. No. 4,789,014, the teachings of which are fully incorporated herein by reference. The disclosed device is used to assist the pharmacist in automatically compounding very small quantities of fluids into a single receiving container. The device allows the pharmacist to accurately transfer multiple individual fluids for multiple source containers into a single receiving container.

In the device, fluid flows from multiple source containers through individual fluid supply conduits into a measuring chamber having a single fluid outlet conduit in fluid communication with a single receiving container. The measuring chamber comprises a load cell that weighs minute quantities of fluids as they are added to the measuring chamber.

The weight signal generated by the load cell of the compounding device is such that it is either a constant value (i.e., a DC output signal) or a ramp wave (i.e., a very low frequency AC output signal). Thus, the signal components of interest in the weight signal are variable.

Further, due to the minute quantities being measured, the weight signal is particularly susceptible to vibrational influences. The weight signal can be highly susceptible to degradation in the presence of environmental vibration, loading shock, and the like.

SUMMARY OF THE INVENTION

The present invention provides a filtering system for filtering mass/weight output signals of a mass/weight measurement apparatus. The invention further provides a load cell output signal filtering system that reduces the environmental vibration influences on the load cell when employed for measuring minute quantities.

To these ends, in an embodiment, the invention provides a system including mass/weight measurement apparatus having a displaceable member specifically designed to have a mechanical resonant frequency higher than the frequency signal components of interest of a signal output from the apparatus; an analog low pass filter coupled to the output of the apparatus; an analog-to-digital converter coupled to an output of the analog low pass filter; and a digital low pass filter coupled to an output of the analog digital filter.

In another embodiment, the measurement apparatus is a load cell.

In another embodiment, the measurement apparatus is part of a compounding system wherein material to be compounded is weighed by the weighing apparatus.

In another embodiment, the analog low pass filter has 5 poles at a cut-off frequency.

In another embodiment, the digital filter is a ten stage filter providing continuously averaged load cell signal data using a weighted average technique.

In another embodiment, the digital filter has $2\frac{1}{2}$ poles at a cut-off frequency.

In another embodiment, the load cell has a resonant frequency of approximately 3 Hz or greater.

In another embodiment, the analog low pass filter has a cut-off frequency of about 1.8 Hz.

In another embodiment, the digital low pass filter has a cut-off frequency of about 4.9 Hz.

An advantage of the invention is a filtering system that eliminates or reduces environmental vibration influences on a signal output from mass/weight measurement apparatus.

Another advantage of the invention is a compounding system that more accurately measures quantities of additives compounded in the device.

Another advantage of the invention is an improved load cell system.

These and other advantages and features of the invention will become more apparent with reference to the following detailed description of the presently preferred embodiments and accompanying drawings.

DETAILED DESCRIPTION OF THE PRESENTLY PREFERRED EMBODIMENTS

Figure 1:
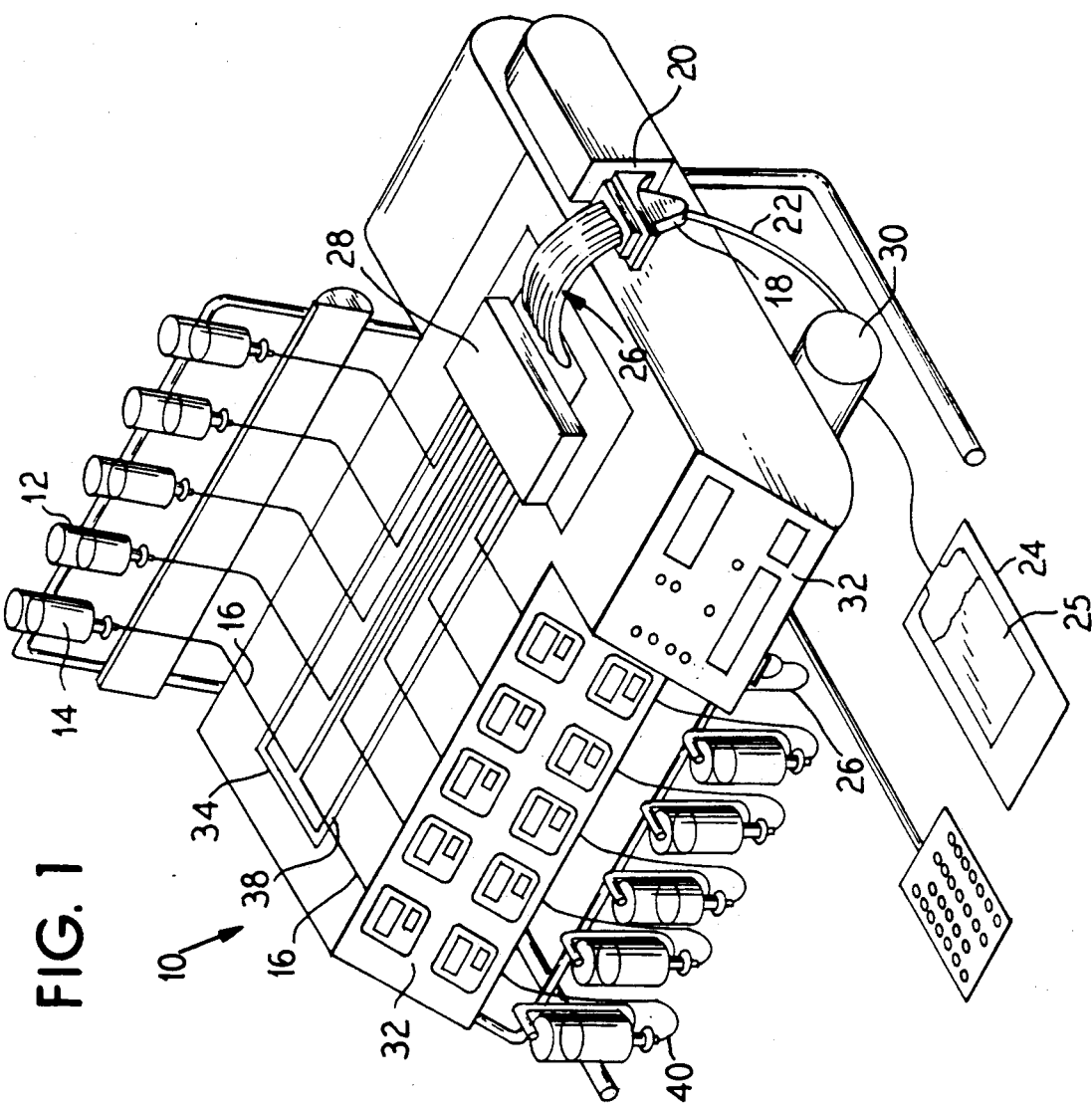
FIG. 1 illustrates in perspective view, a compounding device for mixing and transferring one or more source fluids.

In FIG. 1 there is illustrated a device 10 provided for accurately transferring individual doses of separate fluids from individual source containers 12. Each individual source container can contain a different fluid 14. In some cases, the fluid in one container might be incompatible with fluids contained in other source containers.

Such a device 10 is more fully disclosed and discussed in U.S. Pat. No. 4,789,014, the teachings of which are fully incorporated herein by reference. However, the device will be described herein to assist in the description of the presently preferred embodiments of the invention.

In the device 10, fluid is transferred from each source container 12 through a separate individual fluid conduit 16 to a single chamber 18. The chamber 18 is suspended from a load cell 20. The load cell 20 is a weighing apparatus that constantly weighs the total weight of the chamber 18 to generate an output signal which is indicative of the amount of fluid in the chamber 18 at any given time. As such, the load cell 20 generates a weight signal related to the amount of fluid added to the chamber.

The chamber 18 is provided with a single chamber fluid outlet conduit 22 which is in fluid communication with a single receiving container 24. In a preferred embodiment, the receiving container 24 can be previously partially filled with a base solution 25 consisting of amino acids, dextrose, and fat emulsions. However, it is not required that the receiving container contain any fluid prior to operation of the device.

The chamber 18 also includes a pressure conduit 26 which is coupled to a pressure means. In a preferred embodiment, the pressure means is a single peristaltic pump. The purpose of the pressure means is to selectively create positive and negative pressures in the chamber 18 during operation of the device to control the rate of fluid flow into and out of the chamber 18.

The device 10 is further provided with a first occlusion means 28. The purpose of the first occlusion means is to selectively prevent fluid flow from each of the individual fluid conduits 16 from entering the chamber 18 in the absence of a command from a control means 32, which preferably comprises a system of microprocessors. During operation of the device 10 in a preferred mode, the first occlusion means 28 will only allow fluid to flow from one source container 12 to the chamber 18 at a time. In this manner, it is possible to very accurately monitor the amount of fluid flowing from each container into the chamber 18 through the use of load cell 20.

The device further includes a second occlusion means 30 for selectively occluding fluid flow from the chamber outlet fluid conduit 22 to the receiving container 24. In a preferred embodiment, the second occlusion means 30 is a solenoid occluder.

The control means 32 controls the first and second occlusion means as well as the pressure means. The control means 32 causes the first occlusion means 28 to allow fluid flow through at least one of the individual fluid conduits 16 while causing the second occlusion means 30 to prevent fluid flow from the chamber 18 into the receiving container.

The control means 32 enhances fluid flow into the chamber 18 by operating the pressure means to create a negative pressure in the chamber 18, thereby drawing fluid from a source container 12 through its individual conduit line 16 into the chamber. After the load cell 20 has sensed that the appropriate amount of fluid has entered the chamber 18 from the particular source container 12, the control means causes the first occlusion means 28 to prevent further fluid flow from that source container. At this point, the control means 32 can cause the first occlusion means 28 to allow fluid to flow from another source container 12 into the chamber 18, or the second occlusion means 30 to open to allow fluid to flow from the chamber 18 into the receiving container 24.

The control means 32 may allow a second fluid to flow into the chamber 18 when a first fluid is still present in the chamber if the first and second fluids are compatible with each other and if there is sufficient empty space remaining in the chamber to receive the entire amount of the second fluid to be dispensed. The control means 32 will not allow a second fluid to enter the chamber when a first fluid is still present if the two fluids are incompatible with each other, or if insufficient room exists in the chamber.

The control means 32 enhances fluid flow from the chamber 18 into the receiving container 24 by causing the pressure means to generate a positive pressure in pressure conduit 26 which is in fluid communication with the chamber 18. This causes a positive pressure in the chamber so that when the second occlusion means 30 is opened to allow fluid to flow from the chamber to the receiving container 24, the positive pressure will force the fluid out of the chamber and into the receiving container 24. This greatly reduces fluid retention in the chamber 18.

Figure 2A:
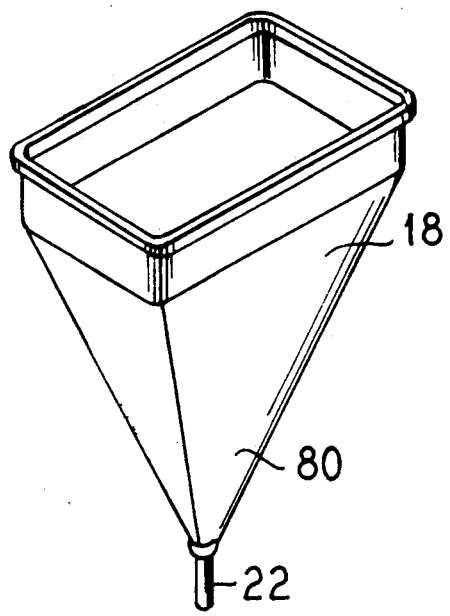
FIGS. 2(a)-(c) illustrate a weighing and mixing chamber used in the device of FIG. 1.
Figure 2B:
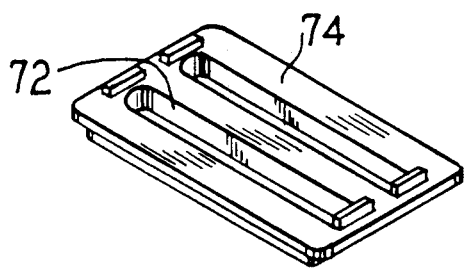
Figure 2C:
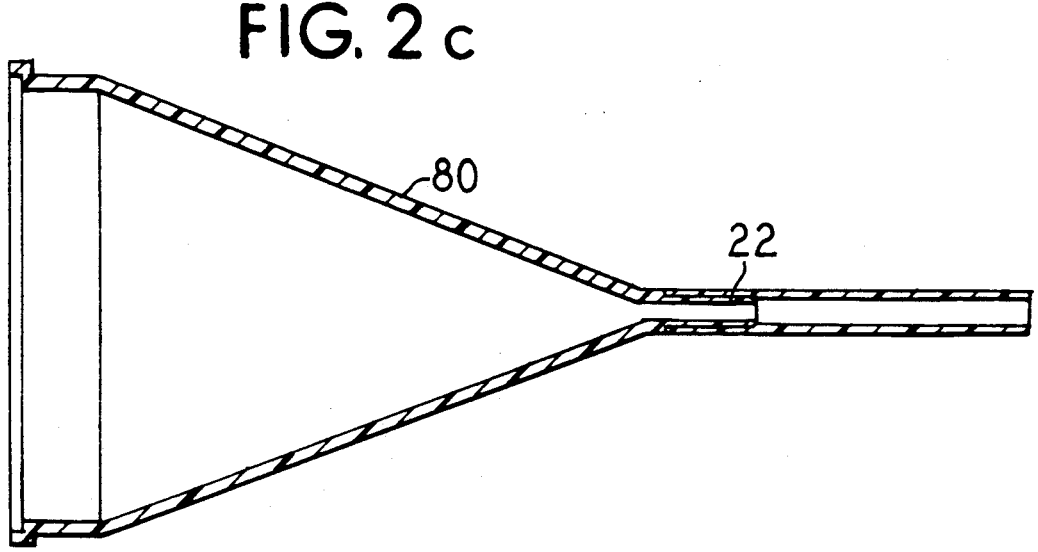

The chamber of a preferred embodiment is more clearly described in FIGS. 2(a), (b) and (c). As illustrated, the chamber 18 has a generally rectangular cross-sectional area in a preferred embodiment. The purpose of providing a rectangular area for the chamber is to allow the body of the chamber to be placed as close as possible to the device 10 when the transfer set 34 is loaded in the device.

The chamber is also designed to have downwardly sloping walls 80 from the top of the chamber to the outlet conduit 22. This helps absorb impact on the load cell of transferred fluid, due to gravity and vacuum induced acceleration. The effective height for acceleration is reduced by the funnel shape. This also reduces splashing which means less need for a rinse cycle. As will be readily apparent, it is possible to design chambers having other shapes.

A key feature of the chamber is that the pressure line 26 (FIG. 1) is in communication with an upper portion of the chamber and that a manifold 67 delivers individual fluids from each of the individual fluid lines into the chamber through a separate fluid path. This means that any mixing of the fluid does not occur until the fluid enters the chamber. As discussed above, it is possible to prevent mixing of fluids in the chamber if desired by emptying the chamber after each individual fluid has entered the chamber.

Figure 4:
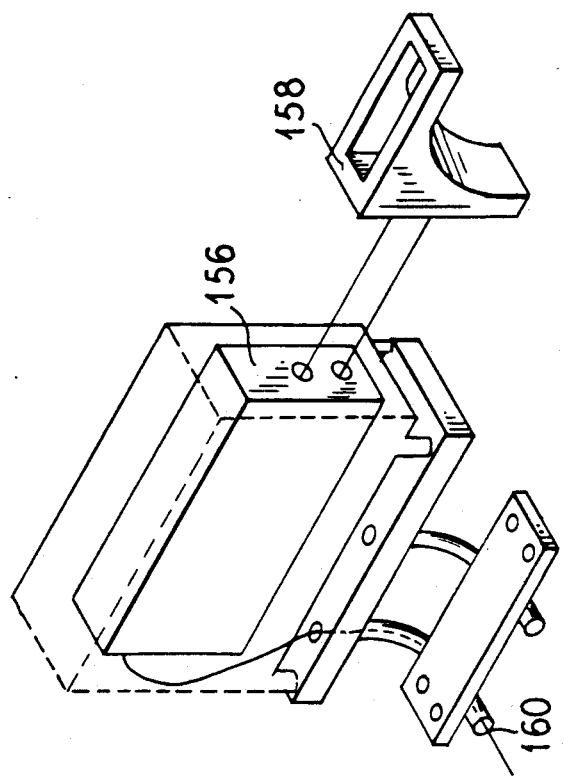
FIG. 4 illustrates in perspective view a housing covering load cell of FIG. 3.
Figure 3:
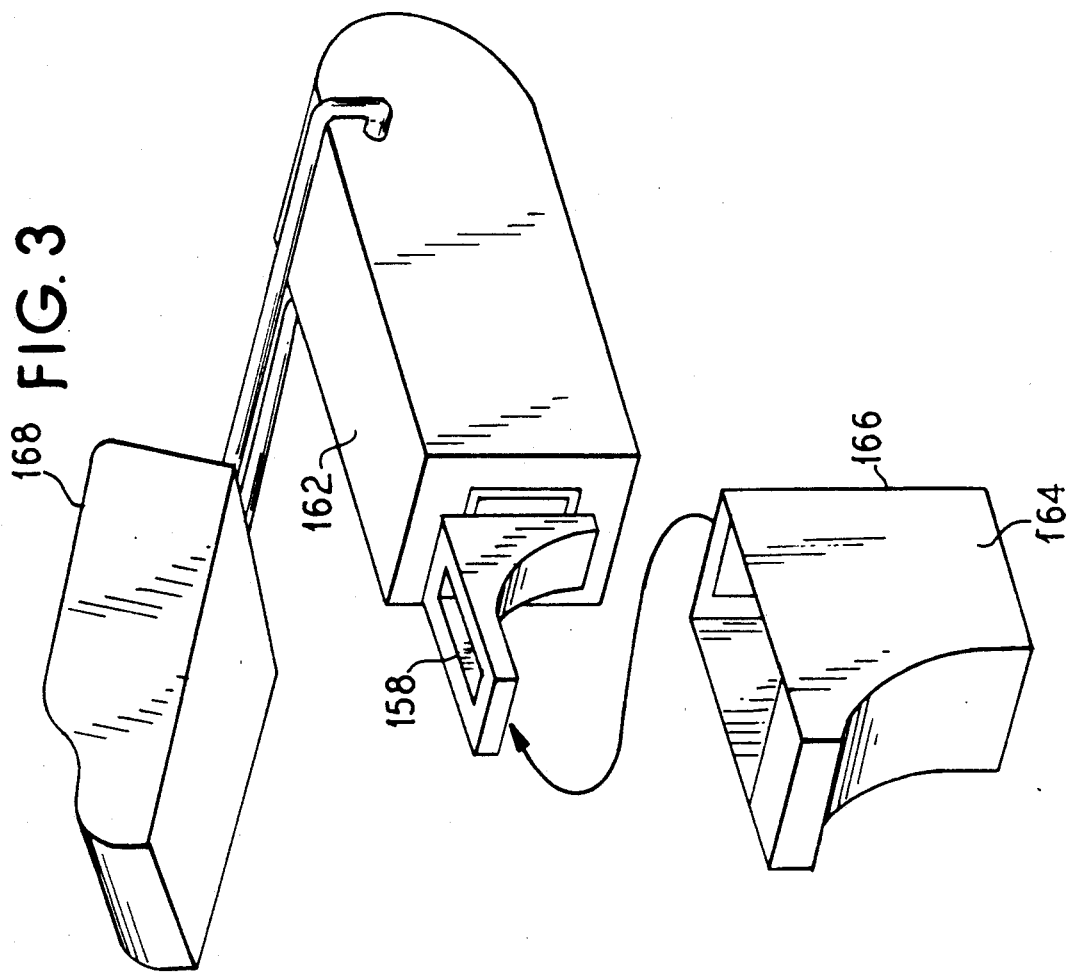
FIG. 3 illustrates in partially exploded view a mechanical design of a load cell assembly.
Figure 5:
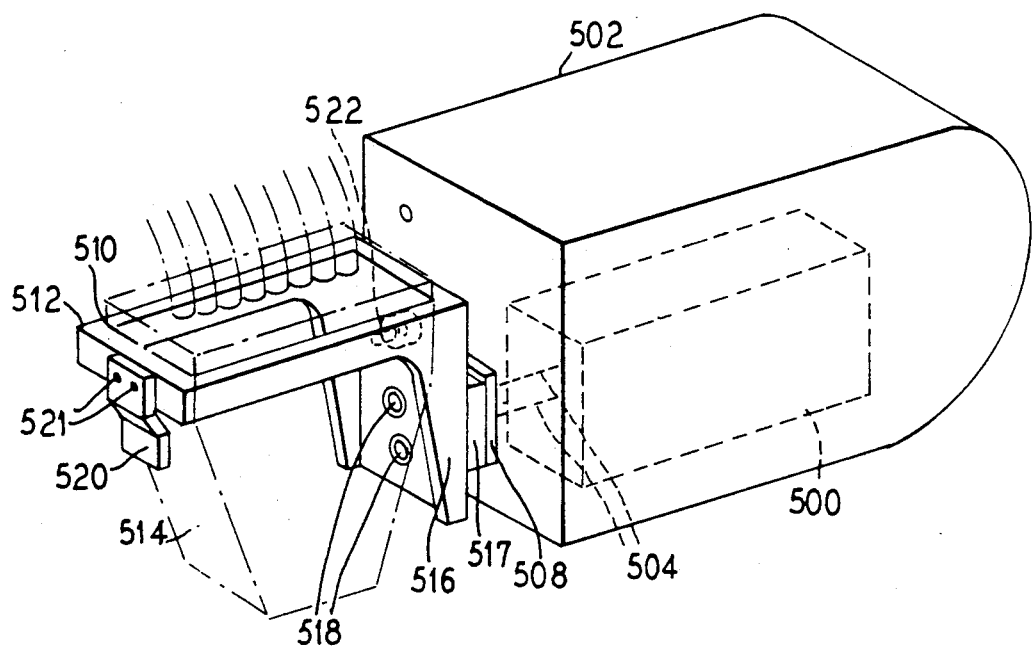
FIG. 5 illustrates in perspective view a chamber support of the load cell of FIGS. 3 and 4.

The details of the mechanical features of a preferred load cell are more clearly illustrated in FIGS. 3, 4, and 5.

Referring to FIG. 3 and FIG. 4, a load cell 156 is connected to a chamber support 158. The chamber support 158 receives the chamber 18. The support 158 thus serves as a displaceable member which is displaceable via leveraging and the like, relative to the load cell 20.

The load cell 156 senses the weight of the chamber and generates weight signals which are indicative of the amount of fluid in the chamber. The electronics of the load cell 156 are discussed in greater detail below. These signals pass through line 160 to the control means 32.

In a preferred embodiment, the load cell 156 is enclosed in a housing 162 as illustrated in FIG. 4. As can be seen in FIG. 4, the chamber support 158 extends outside of the load cell housing 162.

A chamber housing 164 is also provided in a preferred embodiment to protect the chamber and the load cell from variations in load cell readings due to laminar air flow present around the device 10. The chamber housing 164 also prevents unnecessary touch interference with the chamber.

The chamber housing consists of a lower portion 166 which is mounted on the load cell housing 162. The lower portion 166 may be removed periodically to wash the housing. However, it is not necessary to remove the lower portion of the housing 164 to insert a chamber 18 into the chamber support 158. The upper portion 168 of the chamber housing in the preferred embodiment is a hinged lid which is attached to the load cell housing 162.

Referring to FIG. 5, it is illustrated in greater detail how a preferred chamber support can be structured. As illustrated, a load cell 500 is enclosed within a housing 502. The chamber support 508 is attached to the load cell 500 through an opening in the housing 502.

The chamber support 508 preferably is constructed so as to have a substantially horizontal rectangular opening 510 at a top end 512 thereof. A chamber 514 is received through the opening 510 as discussed above.

In side profile, the chamber support 508 preferably comprises a substantially L-shaped member wherein the top end 512 comprises a first leg of the L while a downwardly depending leg 516 serves as the remainder of the L. The leg 516 is attached to the mounting block 507 which extends through the opening in the housing 502. The chamber support 508 is attached to the load cell 500 using two bolts 518.

Attached at one lateral end of the top end 512 positioned away from the housing 502 is a bent clip 520 that serves to exert retaining forces on the chamber 514 when it is inserted within the support 500. To further retain the chamber 514, the support 508 includes a small spring loaded pin 522 that protrudes within the interior of the rectangular opening 510, but at one end adjacent the housing 502, i.e. opposite the clip 520.

The operation of the device 10 is described in greater detail in the following description. After a transfer set has been installed in the device 10, the operator is then ready to program the device to indicate the amount and type of each fluid to be transferred from each of the individual source containers into the receiving container.

In a preferred embodiment, two microprocessors are used in the control means 32. While a variety of microprocessors can be used, in one embodiment of the invention, an Intel 8031 microprocessor can be used for both of the microprocessors. One microprocessor serves as a master microprocessor and another microprocessor serves as a pumping control microprocessor.

Figure 6:
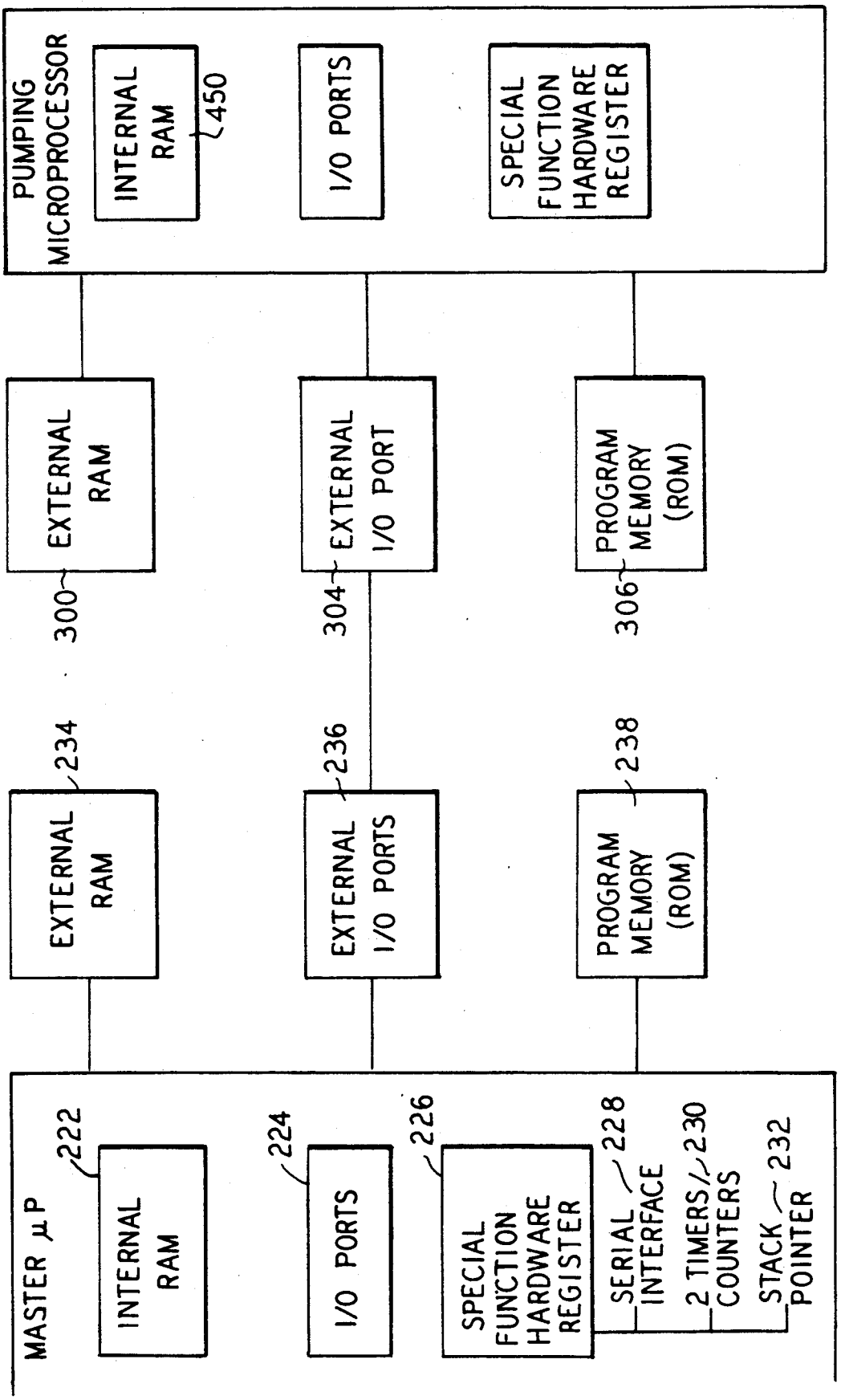
FIG. 6 illustrates a block diagram of a microprocessor.

A simplified block diagram of a typical microprocessor is illustrated in FIG. 6. As illustrated in this figure, a typical microprocessor includes an internal random access memory (RAM) 222 and a plurality of in/out (I/O) ports 224. The microprocessors include a variety of hardware registers which can be programmed to perform special functions. In a preferred embodiment, the special function hardware registers 226 may include serial interface registers 288, timer/counters 230, and stack pointer 232. In addition, to the internal features of a typical microprocessor as briefly described above, additional external hardware is present in a typical microprocessor control device. For example, an external RAM 234, external in/out ports 236, and a programmable memory (ROM) 238 are required to allow a microprocessor to perform the desired functions.

During power up of the device 10, various diagnostics and other checks are performed simultaneously. These diagnostics are discussed in detail in U.S. Pat. No. 4,789,014. The diagnostics include: testing the internal RAM 222 of each microprocessor; testing an external RAM 234 of each microprocessor; initializing internal and external RAMs 222 and 234, initializing all in/out ports 224; and initializing special function hardware 226 located within the microprocessor (i.e. dedicate certain ports 228 for communication purposes, initializing the timer/counter 230 of each microprocessor, initializing the stack pointer for keeping track of program routines).

All of the control logic discussed above is performed by the master microprocessor in a preferred embodiment. The three major functions performed by the pumping microprocessor are to: (1) control the pumping operation of the peristaltic pump; (2) process signals generated by the load cell; and (3) control the occlusion means. When the device 10 is originally turned on by an operator, the pumping microprocessor goes through an initialization process very similar to the initialization process of the master microprocessor, which procedures are fully discussed in U.S. Pat. No. 4,789,014.

The electronics used to generate signals from the load cell is now discussed in greater detail with reference now to FIG. 7, a block diagram of the electronics associated with a load cell 400 of a preferred embodiment of the invention.

Figure 7:
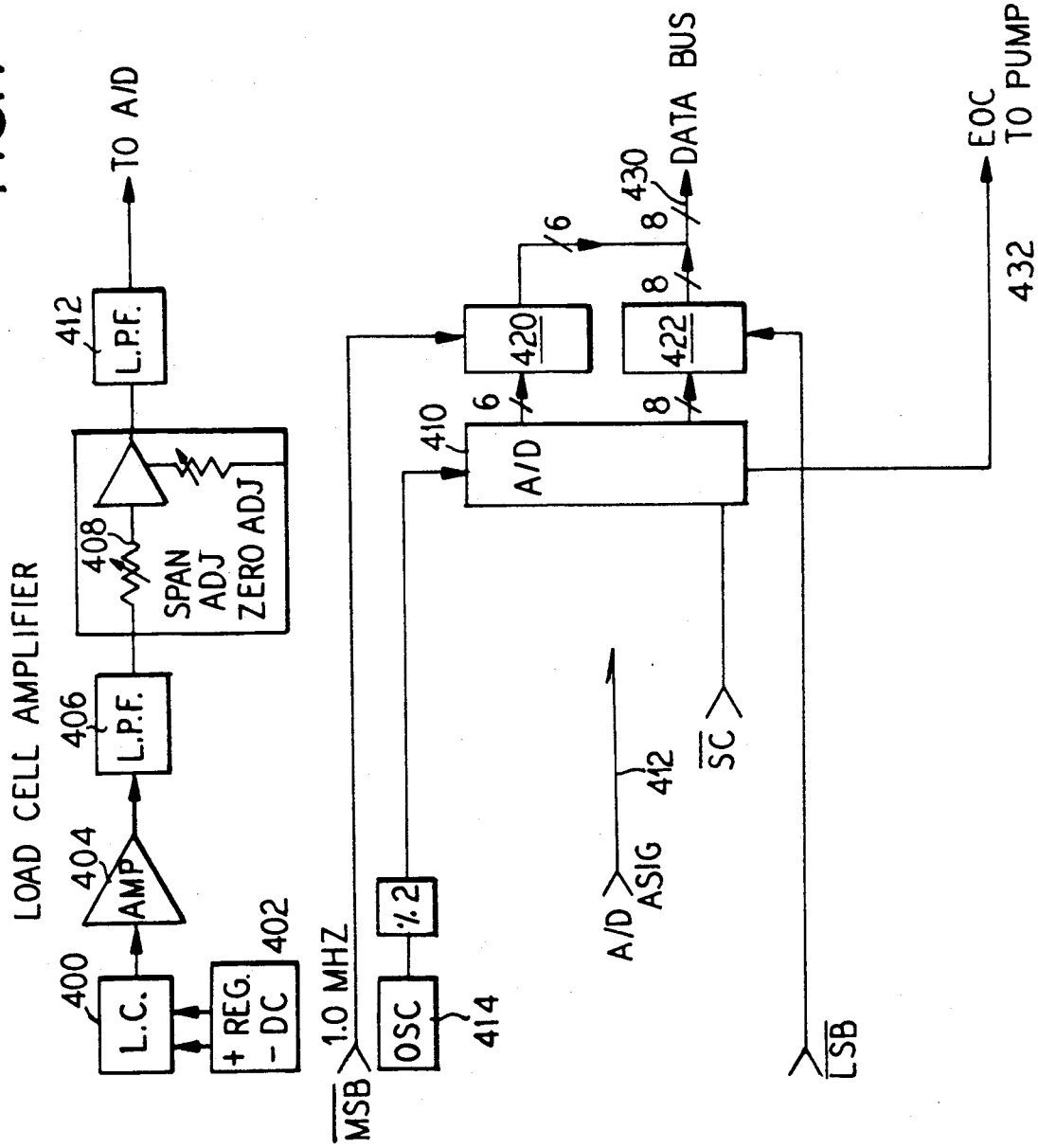
FIG. 7 illustrates an electronic arrangement for the load cell.

As illustrated in FIG. 7, the load cell 400 is powered by a regulated DC source 402. As discussed above, the chamber is suspended from a bracket on the load cell so that the load cell 400 generates an analog signal which is indicative of the weight of both the chamber and any fluid contained in the chamber. The load cell in a preferred embodiment, is a shear-beam type load cell based on resistance strain gauge technology. Weight values are converted by the load cell into DC signal voltages. These voltages, or signal, are fed into a linear amplifier 404. The signal generated by the load cell 400 is a relatively low level signal which requires amplification prior to transmission to an analog-to-digital converter.

The linear amplifier 404 preferably is a commercially packaged integrated circuit, low-noise, low-drift instrumentation amplifier. This instrumentation amplifier 404 provides the bulk of amplification needed to bring the low level signal from the load cell to a level adequate for input into the A/D converter. The signal from amplifier 404 is then passed through a low-pass filter 406. This filter serves to attenuate noise components generated by semiconductors, seismic effects and load cell mechanical resonance.

The signal is then passed from the low-pass filter 406 to a "span trim and zero adjust" stage 408. The span trim function of this stage is used to set the overall load cell amplifier gain (span) to a given millivolt/gram value required at the input to an A/D converter 410. The zero adjust function assures a unipolar signal input voltage to the A/D converter, which is configured in the unipolar mode. The signal is passed from the span trim and zero adjust stage to an additional low-pass filter 412.

The function of low-pass filter 412 is essentially identical to the function of filter 406. The signal then passes to the A/D converter 410 through line 412.

The A/D conversion process is implemented by A/D converter 410 together with peripheral circuitry consisting of a clock oscillator 414. The A/D converter 410 converts the amplitude value of the signal from 412 to an equivalent 14-bit binary coded output signal. This signal is transmitted through gates 420 and 422 which sequentially place a high data byte and then a low data byte on data bus lines 430 to the internal data port of the pumping microprocessor. The information is then transmitted to a status buffer in internal RAM 450 of the pumping microprocessor. Gates 420 and 422 transmit data to the microprocessor after the microprocessor senses the end of conversion signal via line 432 to pumping microprocessor I/O 304. After the low data bye has been transferred, the A/D conversion cycle is completed, and begins again with the arrival of the next start conversion pulse into the A/D 410.

After an updated weight has been received from the load cell 400, the next function performed by the pumping microprocessor is to update the internal RAM 222 of the master microprocessor with weight information contained in internal RAM 450 of the pumping microprocessor. This updating process takes place every four tenths of a second in a preferred embodiment.

As previously discussed, vibration and other external forces can induce undesirable distortions, i.e., noise, in the weight signal derived from the load cell. As an aspect of the invention, a filtering system is provided for filtering these noise signals from the weight signal.

In an embodiment of the invention, the filter system comprises three distinct filtering portions. First, the mechanics of the load cell chamber support are such that the resonant frequency thereof falls far above the frequencies of interest in the weight signal. Second, the analog signal produced by the load cell is subjected to an analog low pass filter, such as the filter 412 of FIG. 7, in a preferred embodiment having five poles at the cut-off frequency thereof. Third, following A/D conversion, the digital sampling values extracted from the weight signal are subjected to a digital low pass filter, in a preferred embodiment having 2½ poles at its cut-off frequency.

In a preferred embodiment, the frequency response of the analog low pass filter provides a five pole filter having its cut-off precisely aligned at 1.8 Hz. The frequency response of the digital filter preferably provides a 2½ pole filter with a cut-off frequency at 4.9 Hz. It is known that the mathematical product of these filters yields the overall analog and digital filter response.

Furthermore, it can be appreciated that the band pass of the system is designed so as not to affect the signal components of interest content of the weight signal.

A typical weight signal or fill signal derived from the load cell 20 comprises either a constant value or a ramp wave. A constant value is derived whenever the measured weight is constant while a ramp wave is derived during a fill routine as the measured weight in the chamber increases. The rate of increase of the weight in the chamber determines the slope of the ramp wave.

Because the ramp wave increases over a period of time, generally greater than 1 second, the frequencies of interest of the weight signal are greater than 0 Hz but also less than about 1-2 Hz. Accordingly, weight signal components having frequencies above approximately 1-2 Hz are not of interest and represent noise in the signal.

With respect to the first portion of the filtering system, it was determined that by making a chamber support, such as that illustrated in FIG. 5, as light as possible, the resonant frequency of load cell and chamber support would be elevated above the frequencies of interest. Accordingly, as a displaceable member of a weighing apparatus, the effect of vibration of the support will have been significantly reduced.

To select an appropriate chamber weight, data was compiled relating the presence of noise in the output signal of a load cell (due to environment vibration) to various chamber support weights. The following table was compiled:

| Action: | | | |
|---|---|---|---|
| | Change One Source Fluid Container on compounder | | |
| Chamber Support Arm Weight (grams) | 6 g | 61 g | 101 g |
| Peak Amplitude of Weight Signal (grams) | .04 g pk—pk | .04 g pk—pk | .13 g pk—pk |
| Frequency Range (Hz) of Weight Signal (all amplitudes) | 3.9– 4.71 | 2.89– 7.14 | 2.63– 5.95 |
| Frequency Range (Hz) of oscillations less than 0.015 g amplitude. | 4.76– 5.88 | 2.87– 7.0 | 2.5– 5.95 |
| | Pound a Hammer on laminar flowhood deck near compounder | | |
| Chamber Support Weight (grams) | 6 g | 61 g | 101 g |
| Peak Amplitude of Weight Signal (grams) | 0.16 g pk—pk | 0.74 g pk—pk | 0.89 g pk—pk |
| Frequency Range (Hz) of Weight Signal | 3.16– 7.14 | 2.33– 5.0 | 2.95– 6.25 |
| | Set Down a 2 Liter Glass Bottle on laminar flowhood deck near compounder | | |
| Chamber Support Weight (grams) | 6 g | 61 g | 101 g |
| Peak Amplitude of Weight Signal (grams) | .024 g pk—pk | .10 g pk—pk | .065 g pk—pk |
| Frequency Range (Hz) of Weight | 3.84– 5.5 | 2.77– 7.14 | 2.68– 5.0 |

| Action: |
| --- |
| Signal |

In a preferred embodiment of the invention, as a compromise between choosing the lightest weight possible and providing adequate structural integrity, the support was chosen to have a weight of approximately 40 grams. Accordingly, the resonant frequency of the support and load cell was selected to fall above 2 Hz, preferably about 3 Hz or greater.

Figure 8:
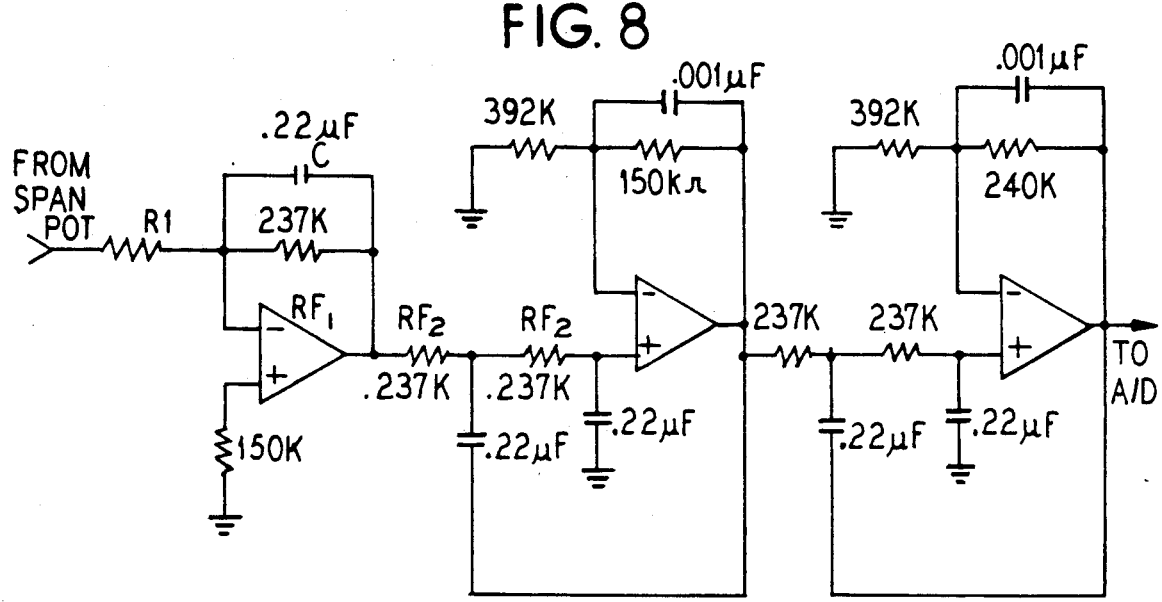
FIG. 8 illustrates an analog low pass filter.

With respect to the second portion of the filtering system, in FIG. 8 there is illustrated a preferred analog low pass filter 600. The illustrated low pass filter 600 comprises three operational amplifier arrangements 602, 604, and 606 appropriately cascaded in series. The low pass filter 600 is referred to as an equal value Sallen-key fifth order low pass filter.

The first operational amplifier arrangement represents a first order low pass filter section while each of the succeeding operational amplifier arrangements 604 and 606 constitute second order low pass filter sections. By cascading these sections together, a fifth order low pass filter is obtained.

With respect to the third portion of the filter system, the digital low pass filter is a software algorithm that implements the following equation:

$$Y_n(t) = \frac{X(t)}{2^n} + n \sum_{m=1}^{n} \left( \frac{2^{m-1}}{2^n} \right)(Y_m(t-1))$$

In this equation: n is the selected number of filter stages; X(t) is the filter input at time t; and $Y_n(t)$ is the filter output at stage n for time t. $Y_m(t-1)$ is the value of stage m at time t−1.

In a preferred embodiment, the digital low pass filter is of a tenth order and accordingly the particular equation effectuated via the software algorithm is the following:

$$Y_{10}(t) = \frac{X(t)}{2^{10}} + 10 \sum_{m=1}^{10} \left( \frac{2^{m-1}}{2^{10}} \right)(Y_m(t-1))$$

This equation translates into the following:

$$Y(t) = \frac{X(t)}{1024} + 10 \sum_{m=1}^{10} (2^{m-11})(Y_m(t-1))$$

In a preferred embodiment, the analog-to-digital conversion of the fill signal requires only about 40 μs so that by the time the base level routine has a chance to pole the H/D convertor again (i.e. obtain another weight fill signal sample) the next conversion is complete. The polling routine itself will wait a maximum of 200 μs for the analog-to-digital conversion routine to finish, once the routine has been entered. The result is that the analog-to-digital converter is poled and read approximately every 5 ms, on average. This results in a sampling rate of about 200 Hz. Pursuant to normally accepted sampling theory, this is at least 100 times greater than the minimum rate of 2 Hz required to accurately reproduce or evaluate signals having frequencies of 1 Hz or less.

The 5 ms interval analog-to-digital samples are then fed through the 10 stage digital algorithm that implements a low pass filter with 2½ poles at about 4.9 Hz. The filter smoothes out the samples, but adds approximately 250 ms phase delay from input to output of the digital filter. Accordingly, the actual readout of the fill signal at any given time is behind the actual amount present in the chamber by approximately 250 ms.

While a preferred embodiment has been shown, modifications and changes may become apparent to those skilled in the art which shall fall within the spirit and scope of the invention. It is intended that such modifications and changes be covered by the attached claims.

We claim:

1. A filtering system for a mass/weight measuring apparatus, comprising:
    a measuring system that provides an analog output signal correlated to a constant or varying sensed mass/weight, said measuring system having a displaceable member with a resonant vibrational frequency above signal components of interest in said output signal;
    a low-pass analog filter coupled to said measuring system for receiving said analog signal, said analog signal providing an output signal;
    an analog-to-digital (A/D) converter coupled to said analog filter for receiving said output signal, said A/D converter providing a digital output signal; and
    a low pass digital filter coupled to said analog-to-digital filter for receiving said digital output signal, said digital filter implementing the following equations:

$$Y_{10}(t) = \frac{X(t)}{2^{10}} + 10 \sum_{m=1}^{10} \left( \frac{2^{m-1}}{2^{10}} \right)(Y_m(t-1))$$

wherein x(t) is the output of the A/D converter at time t, and $Y_{10}(t)$ is the digital filter output at time t, said digital filter continuously averaging said digital signal.

2. The filtering system of claim 1, wherein said analog filter has a cut-off frequency of about 1.8 Hz.

3. The filtering system of claim 1, wherein said digital filter has a cut-off frequency of about 4.9 Hz.

4. The filtering system of claim 1, wherein said analog filter has five poles aligned at about 1.8 Hz.

5. The filtering system of claim 1, wherein said displaceable member has a resonant frequency greater than or equal to about 3 Hz.

6. A filtering system for a mass/weight measuring apparatus, comprising:
    a measuring system that provides an analog output signal correlated to a constant or a bearing sensed mass/weight, said measuring system having a displaceable member with a resonant vibrational frequency greater than frequencies of signal components of interest in said analog output signal;
    a low-pass analog filter coupled to said measuring system for receiving said analog signal, said analog filter providing an output signal, said analog filter having five poles at a cut-off frequency;
    an analog-to-digital (A/D) converter coupled to said analog filter for receiving said output signal, said converter providing a digital output signal; and
    a low-pass digital filter coupled to said analog-to-digital filter for receiving said digital output signal, said digital filter implementing the following equation:

$$Y_n(t) = \frac{X(t)}{2^n} + n \sum_{m=1}^{n} \left( \frac{2^{m-1}}{2^n} \right)(Y_m(t-1));$$

where n is a preselected number of filter stages, x is the output of the A/D converter at time t, and $Y_n(t)$ is the digital filter output stage n at time t.

7. The filtering system of claim 6, wherein n=10.

8. The filtering system of claim 6, wherein the cut-off frequency of said low-pass analog filter is about 1.8 Hz.

9. A method for filtering a mass/weight measuring apparatus output signal comprising the steps of:
providing an analog output signal correlated to a constant or bearing sensed mass/weight;
low pass filtering said output signal via a low-pass analog filter coupled to said measuring system for receiving said analog signal;
providing an output signal from said analog filter;
converting said signal output from said analog filter to a digital signal;
low pass filtering said digital signal via a low-pass digital filter, said low-pass digital filter implementing the following equation:

$$Y_n(t) = \frac{X(t)}{2^n} + n \sum_{m=1}^{n} \left( \frac{2^{m-1}}{2^n} \right)(Y_m(t-1))$$

10. The method as set forth in claim 9, wherein n=10.

11. The method of claim 9, wherein said analog filter has a cut-off frequency of about 1.8 Hz.

12. The method of claim 9, wherein said analog filter has five poles aligned at about 1.8 Hz.

13. A device for accurately transferring multiple individual fluids from multiple source containers to a single receiving container, in which fluid flows from said multiple source containers through individual fluid conduits to a chamber having a chamber fluid outlet conduit in fluid communication with the single receiving container, the chamber also having a pressure conduit, the invention comprising:
first occlusion means for selectively preventing fluid flow from each of said individual fluid conduits to said chamber;
pressure means for selectively creating positive and negative pressures in said chamber to control the rate of fluid flow through said chamber;
second occlusion means for selectively occluding fluid flow from said chamber outlet fluid conduit to said receiving container;
control means for controlling said first and second occlusion means and said pressure means, said control means causing said first occlusion means to allow fluid to flow through at least one of said individual fluid conduits while causing said second occlusion means to prevent fluid flow into said receiving container and simultaneously causing said pressure means to create a negative pressure in said chamber to precisely control the amount of fluid flow into said chamber, said control means further causing said first occlusion means to prevent fluid flow through all of said individual fluid conduits after a predetermined amount of fluid has been delivered to said chamber, said control means then further causing said second occlusion means to allow fluid to flow from said chamber through said outlet conduit while simultaneously causing said pressure means to create a positive pressure in said chamber to force fluid from said chamber into said receiving container;
measuring means for weighing a quantity of fluid as it is transferred to said chamber, said means providing an electrical analog signal correlated to a weight of said fluid; and
means for filtering said output signal of said measuring means including a support for supporting said chamber selected to have a resonant vibrational frequency greater than components of interest of said signal output by said measuring means, an analog low-pass filter said low-pass digital filter implementing the following equation:

$$Y_n(t) = \frac{X}{2^n} + n \sum_{m=1}^{n} \left( \frac{2^{m-1}}{2^n} \right)(Y_m(t-1))$$

an analog-to-digital (A/D) converter, and a low-pass digital filter.

14. The device of claim 13, wherein said analog low-pass filter has five poles at a cut-off frequency of about 1.8 Hz.

15. The device of claim 13, wherein said chamber support has a resonant vibrational frequency greater than or equal to about 3 Hz.

16. The device of claim 13, wherein n=10.

* * * * *